(12) United States Patent
Lindner

(10) Patent No.: US 6,818,689 B1
(45) Date of Patent: Nov. 16, 2004

(54) POLYVINYLCHLORIDE PRODUCTS

(76) Inventor: Robert A. Lindner, 115 Hemlock Dr., N. Wales, PA (US) 19454

( * ) Notice: Subject to any disclaimer, the term of this patent is extended or adjusted under 35 U.S.C. 154(b) by 170 days.

(21) Appl. No.: 10/047,362

(22) Filed: Jan. 14, 2002

Related U.S. Application Data

(63) Continuation-in-part of application No. 07/581,747, filed on Sep. 13, 1990, now abandoned.

(51) Int. Cl.$^7$ .................................................. C08K 5/12
(52) U.S. Cl. ........................ 524/296; 524/297; 524/318; 524/527
(58) Field of Search ................................ 524/296, 297, 524/318, 527

(56) References Cited

U.S. PATENT DOCUMENTS

| | | | | |
|---|---|---|---|---|
| 3,793,274 A | * | 2/1974 | Hiyama et al. | 260/23 |
| 3,905,927 A | * | 9/1975 | Anderson et al. | 260/23 |
| 4,133,794 A | * | 1/1979 | Lamb | 260/31.6 |
| 4,447,569 A | * | 5/1984 | Brecker et al. | 524/109 |
| 4,670,490 A | * | 6/1987 | Yoshida et al. | 524/115 |

* cited by examiner

Primary Examiner—Peter D. Mulcahy
(74) Attorney, Agent, or Firm—Forrest L. Collins Law Offices, LLC; Forrest L. Collins

(57) ABSTRACT

The present invention describes polyvinylchloride processing, commonly by extrusion, which may be utilized to obtain high impact resistance and low gloss polyvinylchloride articles.

11 Claims, No Drawings

POLYVINYLCHLORIDE PRODUCTS

CROSS-REFERENCE TO RELATED APPLICATION

This application claims is a continuation-in-part of Ser. No. 07/581,747 filed Sep. 13, 1990 now abandoned.

BACKGROUND OF THE INVENTION

1. Field of the Invention

This invention relates to the manufacture of polyvinylchloride articles.

2. Description of the Art

The manufacture of polyvinylchloride articles comprises a major segment of the plastic materials in use today. In particular, the polyvinylchloride articles with which the present invention is concerned, include siding for homes. To be useful as a siding, polyvinylchloride must exhibit low gloss and have high impact resistance. The impact resistance is important so that the siding will withstand weather. The low gloss is important so that the siding may be painted.

In U.S. Pat. No. 4,336,176 issued Jun. 22, 1982, to Lindner, there is disclosed manufacture of polyvinylchloride compounds utilizing an organo-tin compound and a partial ester having functionality as both an internal lubricant and a co-stabilizer for they plastic. U.S. Pat No. 4,425,458 issued Jan. 10, 1984 to Lindner describes the use of polyguerbet alcohol esters as lubricants for polycarbonate. U.S. Pat. No. 4,487,874 issued Dec. 11, 1984 to Lindner discloses polycarbonate lubricants which were formed from the partial esterification of pentaerythritol.

U.S. Pat. No. 4,690,977 to Hosoi et al, issued on Sep. 1, 1987, describes vinylchloride polymers comprising a grafted polymer, a vinylchloride polymer, a rubber copolymer, and a lubrication system which includes a wax lubricant and epoxidized soybean oil. Hosoi et al makes similar disclosures in U.S. Pat. No. 4,645,795 issued Feb. 24, 1987.

Schofield et al in U.S. Pat. No. 4,797,440 issued Jan. 10, 1989 describes a thermoplastic polymeric organic medium in the presence of a lubricant and a processing additive containing a divalent aliphatic radical. The stabilization of polyvinylchloride is taught in U.S. Pat. No. 4,338,226 issued Jul. 6, 1982 to Worschech et al. The stabilization of the vinylchloride polymers is also taught by Crochemore et al in U.S. Pat. No 4,102,839 issued Jan. 25, 1978. U.S. Pat. No. 3,951,883 issued Apr. 20, 1976 to Ruchlak et al discloses polyvinylchloride molding compositions.

Tenaka et al in U.S. Pat. No. 4,072,657 issued Feb. 7, 1978 discloses synthetic resins which include vinylchloride-vinylacetate copolymers. U.S. Pat. No. 4,392,581 issued Jul. 12, 1983 to Itsubo et al describes vinylchloride resin compositions. U.S. Pat. No. 3,578,621 issued May 11, 1971 to Stapfer describes stearamide waxes which may be utilized for plastic processing.

This invention deals with lubricant additive systems for polyvinylchloride resins which have superior properties with regard to impact resistance and to having low gloss.

Throughout the specification and claims, percentages and ratios are by weight, temperatures are in degrees Celsius, and pressures are in KPa gauge unless otherwise indicated.

To the extent that any of the references cited herein are applicable, they are hereby specifically incorporated by reference. Ranges and ratios given herein may be combined.

SUMMARY OF THE INVENTION

A rigid polyvinyl chloride article comprising:

A. a polyvinyl chloride resin;

B. a member selected from the group consisting of:
  1. about 0.2 to about 5 weight parts per 100 parts of component A of an ester of a monofunctional organic acid and a dihydric alcohol,
  2. about 0.2 to about 5 weight parts per 100 parts of component A of an ester of a monofunctional organic acid and a monohydric alcohol,
  3. about 0.2 to about 5 weight parts per 100 parts of component A of a monohydric alcohol ester of a dicarboxylic aromatic acid, and,
  4. about 0.2 to about 5 weight parts per 100 parts of component A mixtures of 1 and 2, 1 and 3, 2 and 3, and 1,2, and 3, and;

C. an organic acid having more than 40 carbon atoms, said organic acid being present in a weight ratio of about 0.2 to about 2 parts per part of component B, provided further that said article has at least one of the following properties gloss % reflectance @ 60° of less than 65 and withstands a falling dart impact of greater than 247.1 ft-lb/inch.

DETAILED DESCRIPTION OF THE INVENTION

Component A

Polyvinylchloride resins are made thru the polymerization of vinylchloride monomers. The polyvinylchloride resins obtained are solid materials usually in a particulate form. Polyvinylchloride has the distinct advantage of being able to be extruded into shaped articles which are rigid.

Typically, the polyvinylchloride article is obtained by extruding the polyvinylchloride resin through a twin screw extruder. The extruder masticates the pellets and through the use of heat the polyvinylchloride is obtained as a plastic material. The extruded polyvinylchloride is then fed to a molding or shaping device to obtain the polyvinylchloride article in the desired shape.

During the extrusion of polyvinylchloride, both heat and mechanical energy are applied to the extruder. The mechanical energy input to move the polyvinylchloride through the extruder is eventually present as heat energy in the resin. It is desirable that the polyvinylchloride in the extruder have present materials which function both as internal and external lubricants. An internal lubricant is a material which allows the polyvinylchloride to smoothly flow through the extruder. The smooth flow through the extruder is needed to minimize the energy input to the extruder and to achieve a constant processing rate. The external lubricating component is desirable to avoid having the polyvinylchloride adhere to the inside of the extruder, the die surfaces, or the shaping device.

The manner of masticating the polyvinylchloride is as previously suggested through the use of a twin screw extruder. However, any means may be utilized to prepare the polyvinylchloride in a plastic state. In particular, the invention utilizes polyvinylchloride pellets having a maximum dimension of 5 mm to 25 mm, preferably 6 mm to 12 mm.

Component B

The next aspect of the present invention to be discussed is the lubricant. The lubricant B1 is typically an ester of a monofunctional organic acid and a dihydric alcohol. The monofunctional acid typically contains from 12 to 22, preferably 14 to 20 carbon atoms in the organic acid. The preferred organic acids are saturated materials and in particular stearic acid may be employed herein. The dihydric alcohol typically contains from 2 to 12 carbon atoms and is a saturated material. Preferably the dihydric alcohol contains from 2 to 4 carbon atoms. A preferred example of a dihydric alcohol is ethylene glycol.

Component B1 is typically fully reacted such that there is little if any unreacted hydroxyl or free acid in the ester. That is, each material used to form an ester in Component B is substantially neutral, preferably at least 90, and more preferably at least 95% of the acid and hydroxyl groups are reacted.

A preferred source of component B1 is Lubol lubricant available from L&L Industries Chemical, Inc., P.O. Box 281, Montgomeryville, Pa. A second source of the aforementioned ester is the Henkel Corporation, 300 Brookside Avenue, Ambler, Pa.

Component B2 is the ester of a monofunctonal organic acid and a monohydric alcohol. Preferably, the aforementioned ester contains from 12 to 22 carbon atoms in the organic acid. More preferably, the organic acid contains from 14 to 20 carbon atoms and is more preferably a saturated fatty acid. The preferred organic acid for ester B2 is stearic acid.

The alcohol portion of the ester of component B2 is typically a saturated fatty alcohol containing from 12 to 22, preferably from 14 to 20 carbon atoms. Most preferably, the ester B2 is one of stearyl stearate. Stearyl stearate is available from L&L Industries Chemical, Inc. as Lubol 132 lubricant. Stearyl stearate ester is also available as Loxiol G 32 from the Henkel Corporation.

Component B3 is the monohydric alcohol ester of a dicarboxylic aromatic acid. Typically, the dicarboxylic aromatic acid will be a phthalic acid. The phthalic acid component may be in the form of the ortho, meta, or para form. The monohydric alcohol B3 will have the same preferred description for the monohydric alcohol B2. As previously noted, the lubricant B may be employed as mixtures in all proportions of B1, 2, and 3.

Component C

The organic acid component of the present invention is utilized as an internal lubricant and metal release agent for polyvinylchloride. The organic acid utilized in the present invention is preferably of a high density and is obtained from oxidized polyethylene. Typical properties useful for the organic acid in the present invention are a bulk density of 34 pounds per cubic foot (0.55 kg/liter). It is also desirable that the organic acid utilized herein has a drop point of about 140° C. and a hardness of less than 0.5. The density is desirably 0.98 g/cc as a solid and the viscosity at 150° C. is 8500 cps. The saponification value is typically 24 and the acid number is typically about 16. The organic typically has 45 to 70, preferably 45 to 60 carbon atoms and is monofunctional with regard to the carboxylic group.

Component Usage

The amount of component B utilized herein is typically about 0.2 to about 5, preferably 0.5 to about 4 weight parts per 100 parts of component A. The amount of the organic acid (component C) is typically at about 0.2 to about 5, preferably abou it 0.5 to about 3.5 parts per 100 parts of component A. It is also desirable herein that component C is present to component B in a weight ratio of 0.2 to about 2 parts, preferably about 0.3 to about 1.5 parts per part of component B.

Additional Components

Typically, many additional components are utilized in polyvinylchloride processing. Generally, any of the normally used components in polyvinylchloride processing which do not materially interfere with the functioning of the lubricant system and the desired properties of low gloss and high impact resistance may be utilized herein. For instance, an impact modifier such as Acryloid KM 334 available from Rohm & Haas may be utilized herein at from 1 to 10 weight parts per 100 parts of the polyvinylchloride resin. Fillers and pigments may also be utilized herein typically at from 3 to 20 weight parts per 100 parts of the polyvinylchloride resin. Stabilizers may be utilized herein to neutralize the hydrochloric acid which is generated on degradation of the polyvinylchloride resin. Typically, the stabilizers may be various cadmium, lead, or tin compounds. A preferred tin stabilizer in the present invention is Advisable TM 181. The stabilizers are used in an amount sufficient to neutralize the acid formed upon degradation of the polyvinylchloride. Typically, the stabilizer will be used at 0.3 to 1.0 parts per 100 parts of the polyvinylchloride resin.

A further preferred component herein is a hydrogenated triglyceride. Such materials are utililzed as co-lubricants in the processing of the polyvinylchloride in the extruder.

Processing

The componenets of the present invention are mixed together thoroughly and processed through an extruder. Typically, the extruder will achieve a temperature of 140 to 220, preferably 150 to 200° C. during the extrusion process.

The following is a suggested exemplification of the present invention.

TABLE I

|  | 1 | 2 | 3 | 4 | 5 |
| --- | --- | --- | --- | --- | --- |
| Polyvinylchloride | 100 | 100 | 100 | 100 | 100 |
| Impact modifier* | 5.0 | 5.0 | 5.0 | 5.0 | 5.0 |
| $CaCO_3$ (Superflex 200) | 5.0 | 5.0 | 5.0 | 5.0 | 5.0 |
| $TiO_2$ (Titanox 2101) | 10.0 | 10.0 | 10.0 | 10.0 | 10 |
| Process aid Acryloid K120n | 0 | 0 | 0 | 0 | 1.5 |
| Stabilizer (Advastab TM 181) | 1.2 | 1.2 | 1.2 | 1.2 | 1.2 |
| Calcium stearate |  |  |  | 1.0 | 1.0 |

TABLE I-continued

|  | 1 | 2 | 3 | 4 | 5 |
|---|---|---|---|---|---|
| Organic acid 45 carbon atoms | 0.45 | 0.45 | 0.45 | 0.45 |  |
| Paraffin (XL 165) |  |  |  |  | 1.0 |
| Ethylene glycol distearate | 0.725 |  |  |  |  |
| Hydrogenated tallow | 0.725 |  |  |  |  |
| Stearyl stearate |  | 1.55 |  |  |  |
| Distearyl phthalate |  |  | 1.55 |  |  |
| Brabender fusion, mean values |  |  |  |  |  |
| Fusion time, minutes | 2.2 | 2.2 | 1.8 | 2.4 | 2.3 |
| Maximum torque, m-g | 2850 | 2800 | 3000 | 2950 | 3050 |
| Equilibrium torque, m-g | 2650 | 2750 | 2700 | 2950 | 2850 |
| Stability time, minutes | 32 | 32 | 27 | 36 | 25 |
| Extrusion |  |  |  |  |  |
| Amps | 18.5 | 19 | 22 | 18 | 16 |
| Die pressure, psi | 4100 | 4550 | 4800 | 4100 | 4100 |
| Output, g/min | 103.1 | 108.3 | 104.0 | 112.0 | 106.5 |
| Product properties |  |  |  |  |  |
| Impact, ft-lb/inch** | 302.7 | 295.0 | 265.6 | 247.1 | 215.8 |
| Gloss*** | 45 | 42 | 49 | 65 | 91.0 |
| Delta E at 15,000 hours | 5.2 | 6.1 | 5.5 | 6.7 | 6.6 |

*Acryloid KM334
**Impact measured by falling dart test
***Gloss is % reflectance @ 60°

The components are shown in parts per hundred parts of the polyvinylchicoride. It can be seen that the impact resistance is considerably greater when utilizing the components of the present invention. Similarly, the gloss is significantly lower when utilizing the components of the present invention. Weathering measured by Delta E is also superior.

What is claim is:

1. A rigid polyvinyl chloride article comprising:
   A. a polyvinyl chloride resin;
   B. a member selected from the group consisting of:
      1. about 0.2 to about 5 weight parts per 100 parts of component A of ethylene glycol distearate,
      2. about 0.2 to about 5 weight parts per 100 parts of component A of stearyl stearate,
      3. about 0.2 to about 5 weight parts per 100 parts of component A of distearyl phthalate,
      4. about 0.2 to about 5 weight parts per 100 parts of component A of hydrogenated tallow,
      5. about 0.2 to about 5 weight parts per 100 parts of component A of a pentaerythritol ester and;
   C. oxidized polyethylene having more than 40 carbon atoms present in a weight ratio of about 0.2 to about 2 parts per part of component B,
provided further that said article has at least one of the following properties gloss % reflectance @ 60° of less than 65, withstands a falling dart impact of greater than 247.1 ft-lb/inch, and a Delta E at 15,000 hours of less than 6.6.

2. The rigid polyvinyl chloride article of claim 1 wherein component B is present at about 0.2 to about 5 parts per hundred weight parts of component A.

3. The rigid polyvinyl chloride article of claim 1 wherein component C is present at about 0.2 to about 5 parts per hundred weight parts of component A.

4. The rigid polyvinyl chloride article of claim 1 wherein component C is present to component B in a weight ratio of 0.2 to about 2 parts per part of component B.

5. The rigid polyvinyl chloride article of claim 1 wherein component C contains 45 to 70 carbon atoms.

6. The rigid polyvinyl chloride article of claim 1 wherein component C is present to component B in a weight ratio of 0.3 to about 1.5 parts per part of component B.

7. The rigid polyvinyl chloride article of claim 1 that has both of the following properties gloss % reflectance @ 60° of less than 65 and withstands a falling dart impact of greater than 247.1 ft-lb/inch.

8. The rigid polyvinyl chloride article of claim 1 that has both of the following properties gloss % reflectance @ 60° of less than 65 and a Delta E at 15,000 hours of less than 6.6.

9. The rigid polyvinyl chloride article of claim 1 that has all of the following properties a falling dart impact of greater than 247.1 ft-lb/inch, a gloss % reflectance @ 60° of less than 65, and a Delta E at 15,000 hours of less than 6.6.

10. The rigid polyvinyl chloride article of claim 1 that has both of the following properties a falling dart impact of greater than 247.1 ft-lb/inch, and a Delta E at 15,000 hours of less than 6.6.

11. A rigid polyvinyl chloride article comprising:
   A. a polyvinyl chloride resin;
   B. a member selected from the group consisting of:
      1. about 0.2 to about 5 weight parts per 100 parts of component A of ethylene glycol distearate,
      2. about 0.2 to about 5 weight parts per 100 parts of component A of stearyl stearate, and
      3. about 0.2 to about 5 weight parts per 100 parts of component A of distearyl phthalate, and,
   C. oxidized polyethylene having more than 40 carbon atoms, said organic acid being present in a weight ratio of about 0.2 to about 2 parts per part of component B,
provided further that said article has at least one of the following properties gloss % reflectance @ 60° of less than 65 and withstands a falling dart impact of greater than 247.1 ft-lb/inch.

* * * * *